United States Patent
Brian et al.

(10) Patent No.: US 10,496,395 B2
(45) Date of Patent: Dec. 3, 2019

(54) METHODS AND SYSTEMS FOR INTELLIGENT SOFTWARE UPDATES OF AN APPLIANCE

(71) Applicant: Haier US Appliance Solutions, Inc., Wilmington, DE (US)

(72) Inventors: Joseph Mark Brian, Louisville, KY (US); Richard Dean Suel, II, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 15/914,018

(22) Filed: Mar. 7, 2018

(65) Prior Publication Data
US 2019/0278579 A1    Sep. 12, 2019

(51) Int. Cl.
*G06F 8/65* (2018.01)
*G06F 16/951* (2019.01)

(52) U.S. Cl.
CPC .............. *G06F 8/65* (2013.01); *G06F 16/951* (2019.01)

(58) Field of Classification Search
CPC ................................ G06F 8/65; G06F 16/951
USPC .................................................. 717/168–178
See application file for complete search history.

(56) References Cited

U.S. PATENT DOCUMENTS

| | | | | |
|---|---|---|---|---|
| 5,991,544 A * | 11/1999 | Godse | ................. | G06F 9/44521 717/167 |
| 6,665,384 B2 * | 12/2003 | Daum | ..................... | H04L 29/06 379/102.01 |
| 6,704,401 B2 * | 3/2004 | Piepho | ................ | H04L 12/2856 379/102.03 |
| 7,343,599 B2 * | 3/2008 | Panjwani | ................ | G06F 21/85 717/168 |
| 8,155,120 B2 * | 4/2012 | McCoy | ............... | H04L 12/2803 370/392 |
| 8,473,504 B2 | 6/2013 | Ingles | | |
| 2004/0054764 A1 * | 3/2004 | Aderton | ................ | H04L 41/046 709/223 |
| 2009/0144718 A1 * | 6/2009 | Boggs | ....................... | G06F 8/65 717/170 |
| 2009/0300593 A1 * | 12/2009 | Faus | ................... | G06F 9/44505 717/168 |
| 2013/0185563 A1 * | 7/2013 | Djabarov | ................ | G06F 8/654 713/176 |

(Continued)

FOREIGN PATENT DOCUMENTS

CN          106325818 A      1/2017

OTHER PUBLICATIONS

Bhoyar, Mayur R., Suraj Chavhan, and Vaidehi Jaiswal. "Secure method of updating digital notice board through SMS with PC monitoring system." IOSR Journal of Computer Science (IOSRJCE), e-ISSN (2014): pp. 2278-0661. (Year: 2014).*

(Continued)

*Primary Examiner* — Satish Rampuria
(74) *Attorney, Agent, or Firm* — Dority & Manning, P.A.

(57) ABSTRACT

Systems and methods for intelligently updating a software configuration of an appliance are provided. In particular, the systems and methods include features for performing software updates based on the unique identity or fingerprint of one or more control boards present in the appliance. Further, methods for tracking appliances with unknown software configurations are also provided.

19 Claims, 10 Drawing Sheets

(56) References Cited

U.S. PATENT DOCUMENTS

2014/0019530 A1* 1/2014 Dal Bello .............. G05B 23/02
                                                  709/203
2017/0097621 A1* 4/2017 Ackmann .......... G05B 19/0426

OTHER PUBLICATIONS

Cheng, Rung Shiang, Chia Peng Lin, and Jiun Yu Jhou. "A Location-Aware Home Appliance Control System." 2014 Tenth International Conference on Intelligent Information Hiding and Multimedia Signal Processing. IEEE, 2014.pp. 666-669 (Year: 2014).*

Van Zoest, David, and David Otten. "Implementation of a simulated washing machine with an integrated control panel and intra-appliance local interconnect network bus." IATC, 53rd Annual Conference. 2002.pp. 1-12 (Year: 2002).*

* cited by examiner

METHODS AND SYSTEMS FOR INTELLIGENT SOFTWARE UPDATES OF AN APPLIANCE

FIELD OF THE INVENTION

The present subject matter relates generally to appliances, and more particularly to systems and methods for updating a software configuration of an appliance.

BACKGROUND OF THE INVENTION

Consumer appliances, such as refrigerator appliances, oven appliances, microwave appliances, dishwasher appliances, etc., generally include one or more components for directing operation of a given consumer appliance. For example, a consumer appliance may include one or more control boards or controllers communicatively coupled with a control pad. Through programmed instructions and input from the control pad, the controller may direct operations of other components of the appliance.

Generally, there is a need to update appliance software in a post-factory environment. Such software updates may patch existing appliance software or may be applied to compensate for an appliance hardware issue, for example. In order to perform software updates on multiple and varied consumer appliances, it is often important to uniquely identify each consumer appliance such that the correct payload of a software update package may be provided to the appliance. Certain functions may be common to multiple different models, but different models may also have functions that are not common between them. In other words, there may be a number of variations between different consumer appliances of the same type (e.g., two or more refrigerator appliance models). Between different types of consumer appliances (e.g., a refrigerator appliance model and an oven appliance model), even more variations may exist. Over time, even identical models of a consumer appliance (e.g., appliances having the same model number) may have variations between them (e.g., different versions of software installed on the controller of each respective consumer appliance).

Given the large and ever-changing pool of consumer appliances that may need a software update, uniquely identifying each consumer appliance can be especially difficult. Existing systems typically rely on exhaustive databases of specific model numbers to match a particular software payload to the appliance. Such databases can be cumbersome and difficult to maintain. Moreover, the databases may fail to account for changes to individual appliances that share a common model (e.g., a custom software update that may be made to one consumer appliance of a certain model number, but not to another consumer appliance of the same model number). Further, in some instances, some appliances may not have a model number written to the control board at all, and consequently, identifying the appliance automatically by the model number is not possible. In addition, some appliances in the field include unknown software configurations (e.g., due to the appliance being a counterfeit appliance or due to a production issue). Such appliances may have non-genuine hardware or software (or both) and may not have a known model number. In such instances, the appliance software may not be able to be updated based on model number. Additionally, tracking of such counterfeit appliances has been difficult as new counterfeit appliances and software packages spring up routinely. It is desirable to track such appliances with unknown configurations such that quality control can be better maintained, among other reasons.

Therefore, improved systems and methods for updating a software configuration of an appliance would be useful. In particular, it would be advantageous to provide systems and methods for performing software updates based on the unique identity of an appliance, yet do not require reliance on, or determination of, a model number. Further, methods for tracking appliances with unknown software configurations would also be advantageous.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to a method of updating a software configuration of an appliance. The method includes receiving, by one or more computing devices, a software update package comprising a plurality of candidate payloads applicable to a plurality of appliance configurations, each of the plurality of candidate payloads comprising one or more update images each comprising identifying characteristics. Further, the method includes receiving, by the one or more computing devices, for one or more control boards present in the appliance, identifying characteristics associated with one or more software images of the one or more control boards present in the appliance. In addition, the method includes determining, by the one or more computing devices, an appliance payload from the plurality of candidate payloads based at least in part on the identifying characteristics associated with the one or more software images of the one or more control boards present in the appliance and the identifying characteristics of the update images of the candidate payloads of the software update package.

Another example aspect of the present disclosure is directed to a system for updating a software configuration of an appliance having one or more control boards. The system includes a programming entity in operative communication with the appliance. The programming entity is configured to: receive a software update package, the software update package comprising a plurality of candidate payloads each comprised of one or more update images, each of the one or more update images comprising identifying characteristics; query the appliance to discover identifying characteristics associated with one or more software images of the one or more control boards present in the appliance; receive the identifying characteristics associated with the one or more software images of the one or more control boards present in the appliance; compile the identifying characteristics associated with the one or more software images into unique image identifiers, wherein each of the one or more software images has an associated unique image identifier; compare the unique image identifiers with the identifying characteristics of the one or more update images of the plurality of candidate payloads; and determine an appliance payload based at least in part on the comparison between the unique image identifiers and the identifying characteristics of the plurality of candidate payloads of the software update package.

Another example aspect of the present disclosure is directed to a method for updating a software configuration of an appliance having one or more control boards. The method includes receiving a software update package comprising a plurality of candidate payloads each comprising one or more update images each comprised of metadata, the metadata of each of the one or more update images comprising identifying characteristics. The method also includes querying the appliance to discover metadata of one or more software images associated with the one or more control boards present in the appliance, the metadata of each of the one or more software images comprising identifying characteristics. The method further includes receiving the identifying characteristics of the one or more software images. In addition, the method includes comparing the identifying characteristics of the one or more update images with the identifying characteristics of the one or more software images. Moreover, the method includes determining if one of the plurality of candidate payloads of the software update package are a match for the appliance based at least in part on the comparison between the identifying characteristics of the one or more update images and the identifying characteristics of the one or more software images.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
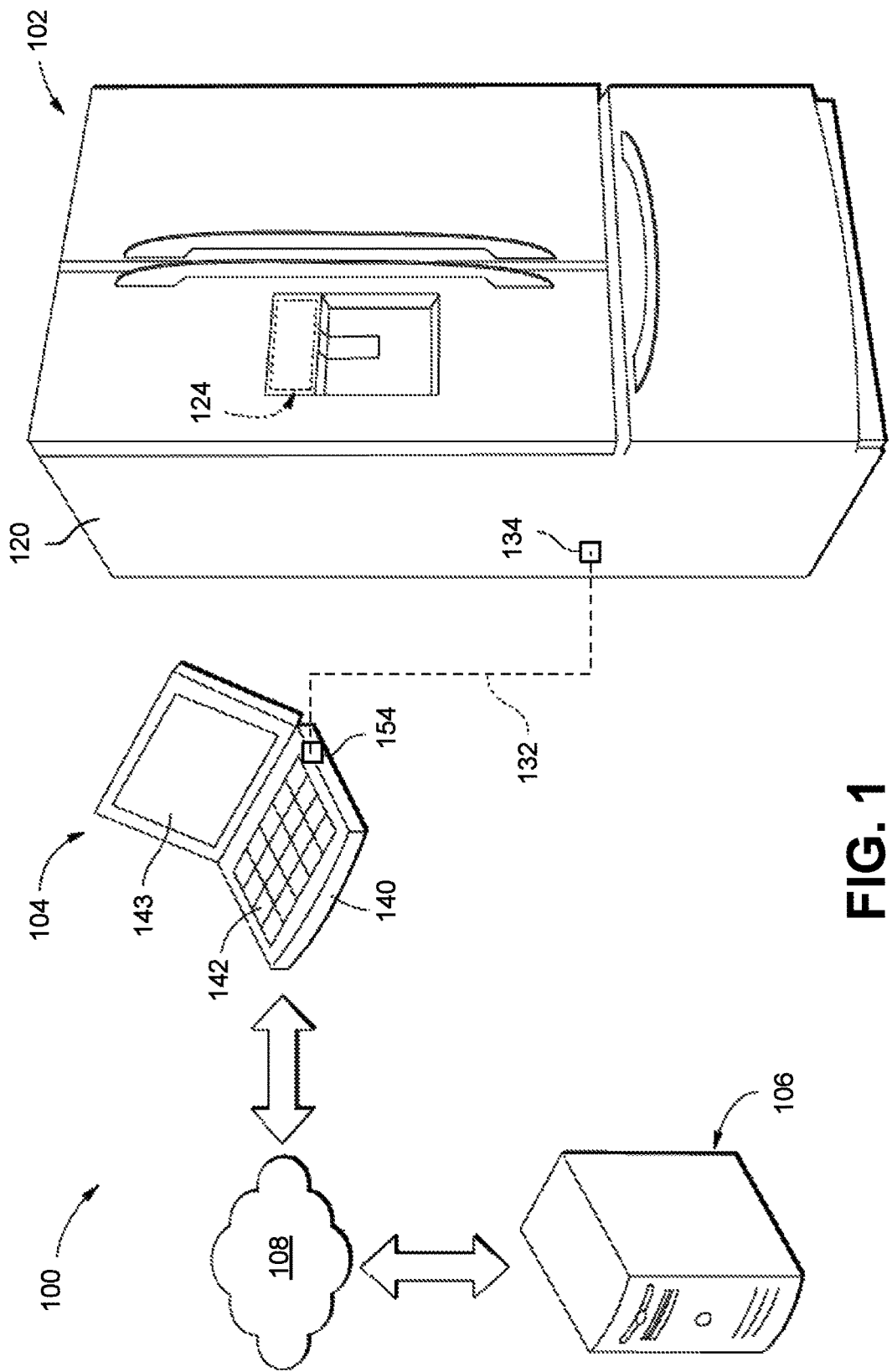
FIG. 1 provides a schematic view of a software update system according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

It is noted that, for the purposes of the present disclosure, the terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 2:
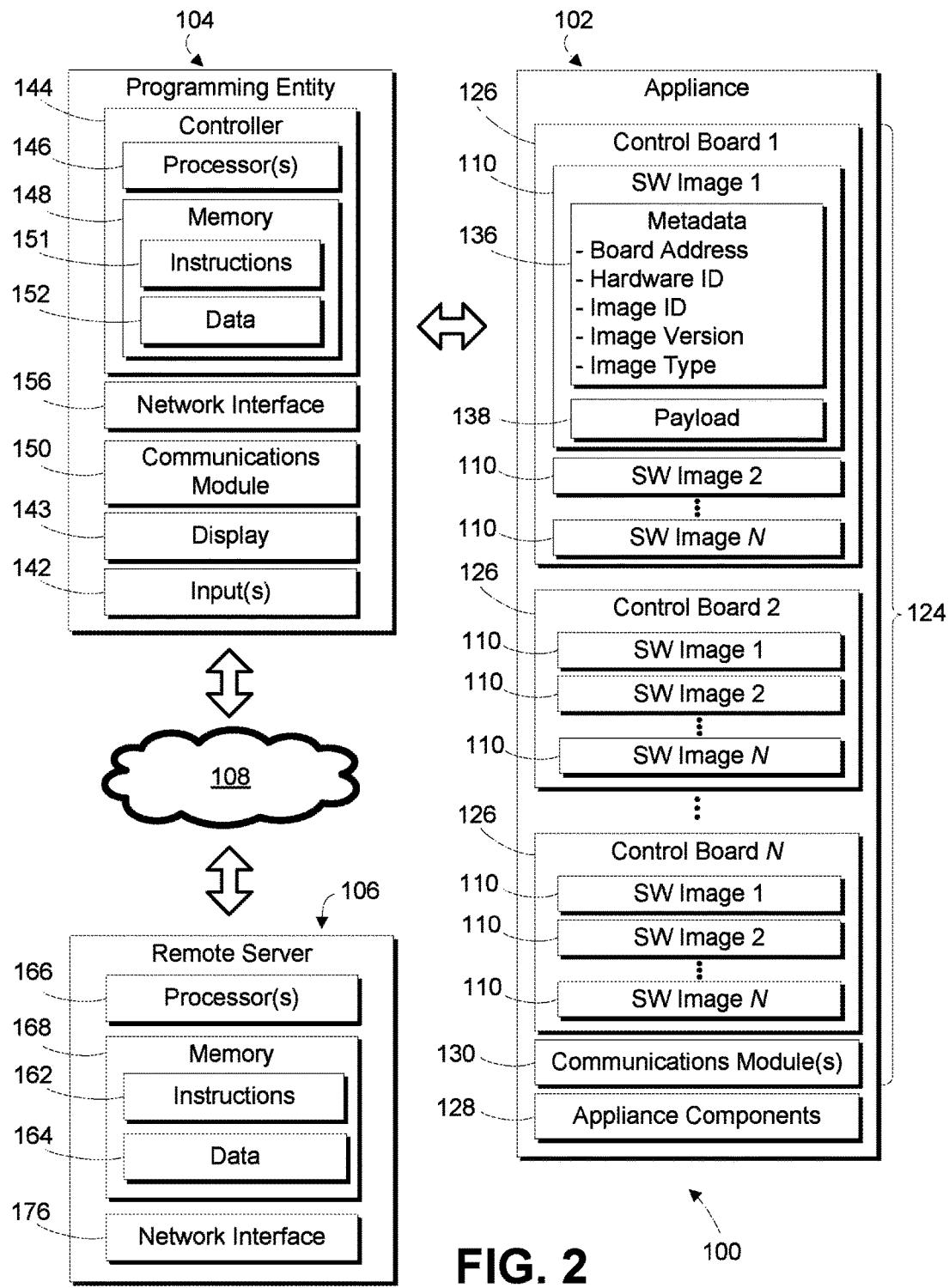
FIG. 2 provides a further schematic view of the software update system of FIG. 1.

FIGS. 1 and 2 provide schematic views of a software update system 100 according to exemplary embodiments of the present disclosure. Generally, software update system 100 may be utilized to perform software updates on a consumer appliance 102. In particular, a programming entity 104 and a remote server 106 may be permitted to communicate with consumer appliance 102 in order to aid or facilitate such software update operations, as will be described in detail below. Moreover, as shown, programming entity 104 can be communicatively coupled with a network 108 and various nodes coupled with the network 108, such as a remote server 106. Additionally or alternatively, although network 108 is shown, programming entity 104 may not be communicatively coupled via network 108; rather, programming entity 104 can be communicatively coupled via a suitable wired or wireless means not over network 108, such as, for example, via physical wires, transceiving, transmitting, or receiving components. The communicative coupling may establish a constant or intermittent connection between programming entity 104 and network 108. For instance, if the connection is intermittent, programming entity 104 may continue to operate "offline" such that data or information gathered during a break in the connection may be transmitted after the connection is reestablished.

It is noted that although consumer appliance 102 is shown as a refrigerator appliance, additional or alternative embodiments may provide a different consumer appliance (e.g., different type of appliance), such as an oven appliance, microwave appliance, dishwasher appliance, washing machine appliance, dryer appliance, or any other suitable consumer appliance.

Consumer appliance 102 includes a cabinet 120 (FIG. 1) and one or more appliance components 128 (FIG. 2) (e.g., compressor, heating element, motor, air blower, etc.)

attached thereto for performing the predetermined functions of the consumer appliance 102 (e.g., cooling, heating, etc.). Such appliance components 128 are assembled in communication with a corresponding appliance controller 124 that is, for example, mounted on or within cabinet 120 of consumer appliance 102).

As shown particularly in FIG. 2, appliance controller 124 includes one or more control boards 126 [e.g., a first control board (Control Board 1), a second control board (Control Board 2), and so on as represented by Control Board N]. Each control board 126 may include one or more processors and one or more memory devices. The one or more processors can be any suitable processing device (e.g., a processor core, a microprocessor, an ASIC, a FPGA, a microcontroller, etc.) and can be one processor or a plurality of processors that are operatively connected. The memory device can include one or more non-transitory computer-readable storage mediums, such as RAM, ROM, EEPROM, EPROM, flash memory devices, magnetic disks, etc., and combinations thereof. The memory devices can store data and instructions that are executed by the processor to cause consumer appliance 102 to perform various operations. For example, instructions could be instructions for directing activation of one or more appliance components 128. Instructions could further be for receiving/transmitting information and software payloads from programming entity 104, etc.

For this embodiment, as shown in FIG. 2, each control board 126 of appliance 102 includes one or more software images 110. Each software image 110 includes (e.g., within the memory) header or metadata 136 and a payload 138. The metadata 136 of each software image 110 includes identifying characteristics that are descriptive of its associated control board. Payload 138 includes functional aspects of the software image. As an example, the identifying characteristics provided in the metadata 136 of each software image 110 of each control board 126 may include identifying characteristics of the control board associated with the metadata. For instance, the identifying characteristics may include a board address (e.g., provided in hexadecimal form), a hardware identification of the control board, or an image identification relating to software preprogrammed on that particular control board. As further examples, additionally or alternatively, the identifying characteristics may include an image version (e.g., the version or iteration number of the software programmed on the control board) and an image type (e.g., an application, a bootloader, a parametric, or an auxiliary image type). As still another additional or alternative example, although not shown in FIG. 2, the identifying characteristics may include a personality configuration (e.g., one or more programmed settings specifying which portion or package of the software is to be executed).

In accordance with exemplary aspects of the present disclosure, to update the software configuration of an appliance, one or more of the identifying characteristics (e.g., a plurality of identifying characteristics) may be extracted for each software image 110 of each control board 126 and provided to programming entity 104. Then, in an image by image comparison, the software images are compared with update images of various candidate payloads to determine if any of the candidate payloads are a match for the appliance. More particularly, the identifying characteristics of the software images are compared with the identifying characteristics of the update images to determine if the update images, and consequently the candidate payload, are a match for the appliance. If the identifying characteristics of the images match, then the candidate payload is selected for inclusion in an appliance payload that is provided to appliance 102 for updating the software configuration of appliance 102. Advantageously, appliance 102 may receive a software update based at least in part on the identifying characteristics that are descriptive of the identity of the appliance, and thus, the software configuration of appliance 102 may be updated without need to specifically identify the model number of consumer appliance 102. This may, for example, eliminate or reduce the need for maintaining an ever-changing model number library, the need for model-number specific payload packages to be developed, and greatly reduces human involvement in selecting the correct software payload to update the appliance. Further, appliances that do not have model numbers written to their control boards may be updated without the risk of a human selecting the wrong payload as there is no opportunity for a human to "guess" the model number of the appliance.

As shown in FIGS. 1 and 2, appliance controller 124 includes one or more communications modules 130 (FIG. 2) such that consumer appliance 102 can selectively connect to and communicate with programming entity 104 (e.g., over one or more signal lines, shared communication busses, or wireless communications bands). In certain embodiments, conductive transmission lines 132 (FIG. 1), such as wires, extend between consumer appliance 102 and programming entity 104 in connection therewith. Communications module 130 can be an onboard component of appliance controller 124 or it can be a separate, off board component. In some embodiments, communications module 130 includes or is joined to an RJ45 terminal 134 (FIG. 1) on cabinet 120. When connected to the programming entity 104, the RJ45 terminal 134 on cabinet 120 may thus be positioned between appliance controller 124 and programming entity 104.

As illustrated in FIG. 1, programming entity 104 generally includes a casing 140 spaced apart from consumer appliance 102 (e.g., when connected thereto). In some embodiments, a user interface is provided on (e.g., mounted or attached to) casing 140. As indicated in FIGS. 1 and 2, user interface generally includes one or more control inputs 142, such as one or more of a variety of electrical, mechanical, or electro-mechanical input devices. Control inputs 142 may include, for example, rotary dials, knobs, push buttons, and touch pads. A controller 144 of programming entity 104 is in communication with user interface 142 and control inputs 142 through which a user (e.g., service professional) may select various operational features and modes for programming entity 104 or consumer appliance 102 (e.g., when connected thereto). User interface may further include a display component 143, such as a digital or analog display in communication with controller 144 and configured to provide operational feedback to a user or service professional. In particular, the display component 143 may be configured to present or display a graphical user interface (GUI) programmed into controller 144. Multiple GUIs may be provided within each controller 144. The GUI that is presented or displayed at any given moment may be based at least in part on the unique system identifier of the appliance to which programming entity 104 is connected (e.g., consumer appliance 102). In certain embodiments, user interface, including control inputs 142, represents or includes a general purpose I/O ("GPIO") device or functional block.

Controller 144 may include one or more processors 146 and one or more memory devices 148 (i.e., memory). The one or more processors 146 can be any suitable processing device (e.g., a processor core, a microprocessor, an ASIC, a FPGA, a microcontroller, etc.) and can be one processor or a plurality of processors that are operatively connected. The memory device 148 can include one or more non-transitory computer-readable storage mediums, such as RAM, ROM, EEPROM, EPROM, flash memory devices, magnetic disks, etc., and combinations thereof. The memory devices 148 can store data 152 and instructions 151 that are executed by the processors 146 to cause programming entity 104 to perform operations. For example, instructions 151 could be instructions 151 for executing or directing a software update of consumer appliance 102, receiving/transmitting signals to/from remote server 106, etc. The memory devices 148 may also include data 152, such as a one or more GUI files, software installation files, etc. that can be retrieved, manipulated, created or stored by processors 146.

Controller 144 includes a communications module 150 such that programming entity 104 can selectively connect to and communicate with consumer appliance 102 (e.g., over one or more transmission lines 132, shared communication busses, wireless communications bands, etc.). Communications module 150 can be an onboard component of controller 144 or it can be a separate, off board component. In some embodiments, communications module 150 includes or is joined to a communications terminal 154 (FIG. 1) on casing 140 (e.g., such that terminal 154 is formed directly on casing 140 or held in attachment on casing 140 by an intermediate adapter). Generally, communications terminal 154 may include, or be provided as, any suitable transceiving terminal (e.g., USB, RJ45, etc.). When connected to consumer appliance 102, the communications terminal 154 on casing 140 may thus be positioned between controller 144 and appliance controller 124. In some embodiments, conductive transmission line 132 may be selectively joined to and removed from the communications terminal 154 on casing 140 or the RJ45 terminal 134 on cabinet 120 (e.g., to selectively connect and disconnect controller 144 and appliance controller 124). Additionally or alternatively, communications module 150 of programming entity 104 can selectively connect to and communicate with consumer appliance 102 wirelessly, e.g., via Bluetooth, WiFi, etc.

In some embodiments, controller 144 includes a network interface 156 (FIG. 2) such that programming entity 104 can connect to and communicate over one or more networks (e.g., network 108) with one or more network nodes. Network interface 156 can be an onboard component of controller 144 or it can be a separate, off board component. Controller 144 can also include one or more transmitting, receiving, or transceiving components for transmitting/receiving communications with other devices communicatively coupled with programming entity 104. Additionally or alternatively, one or more transmitting, receiving, or transceiving components can be located off board for controller 144.

Network 108 can be any suitable type of network, such as a local area network (e.g., intranet), wide area network (e.g., internet), low power wireless networks [e.g., Bluetooth Low Energy (BLE)], cellular network (e.g., GSM, CDMA, etc.), or some combination thereof and can include any number of wired or wireless links. In general, communication over network 108 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, a remote server 106, such as a web server, is in operable communication with programming entity 104. The remote server 106 can be used to host a service platform or cloud-based application. Additionally or alternatively, remote server 106 can be used to host an information database (e.g., of unique system identifiers). Remote server 106 can be implemented using any suitable computing device(s). Remote server 106 may include one or more processors 166 and one or more memory devices 168 (i.e., memory). The one or more processors 166 can be any suitable processing device (e.g., a processor core, a microprocessor, an ASIC, a FPGA, a microcontroller, etc.) and can be one processor or a plurality of processors that are operatively connected. The memory device 168 can include one or more non-transitory computer-readable storage mediums, such as RAM, ROM, EEPROM, EPROM, flash memory devices, magnetic disks, etc., and combinations thereof. The memory devices 168 can store data 164 and instructions 162 which are executed by the processors 166 to cause remote server 106 to perform operations. For example, instructions 162 could be instructions 162 for receiving/transmitting files related to a software update of appliance 102.

The memory devices 168 may also include data 164 that can be retrieved, manipulated, created, or stored by processors 166. The data 164 can be stored in one or more databases. The one or more databases can be connected to remote server 106 by a high bandwidth LAN or WAN, or can also be connected to remote server 106 through network 108. Optionally, the one or more databases can be split up so that they are located in multiple locales.

Remote server 106 includes a network interface 176 such that interactive remote server 106 can connect to and communicate over one or more networks (e.g., network 108) with one or more network nodes. Network interface 176 can be an onboard component or it can be a separate, off board component. In turn, remote server 106 can exchange data with one or more nodes over the network 108. In particular, remote server 106 can exchange data with programming entity 104. Although not pictured, it is understood that remote server 106 may further exchange data with any number of client devices over the network 108. The client devices can be any suitable type of computing device, such as a general purpose computer, special purpose computer, laptop, desktop, integrated circuit, mobile device, smartphone, tablet, or another suitable computing device. Information or signals (software payloads or payload image files) may thus be exchanged between programming entity 104 and various separate client devices through remote server 106.

Figure 3:
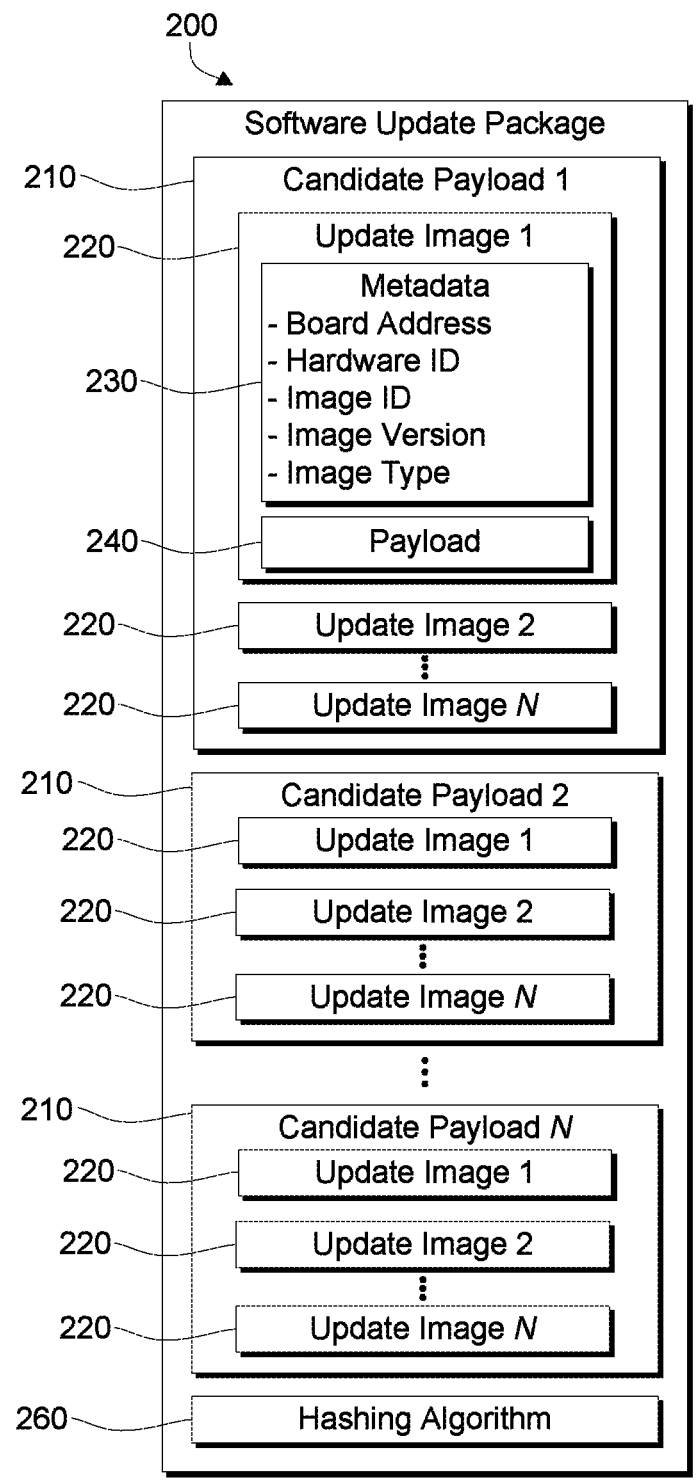
FIG. 3 provides an exemplary payload image file according to exemplary embodiments of the present disclosure.

FIG. 3 provides a block diagram of an exemplary software update package 200 according to exemplary embodiments of the present disclosure. As shown, for this exemplary embodiment, update package 200 includes one or more candidate payloads 210 each having one or more software update images 220. For instance, as shown for the depicted update package 200 of FIG. 3, the candidate payloads 210 of update package 200 include Candidate Payload 1, Candidate Payload 2, and so on to Candidate Payload N. Each candidate payload 210 may be applicable to a particular appliance or a group of appliances having particular attributes, as will be described in detail herein.

Each candidate payload 210 includes one or more software update images 220, as noted above. As one example, as shown in FIG. 3, Candidate Payload 1 includes Update Image 1, Update Image 2, and so on to Update Image N. Each update image 220 includes header or metadata 230 and a payload 240. The metadata 230 includes identifying characteristics that are descriptive of its associated update image 220. Metadata 230 of the update images 220 include identifying characteristics that may be compared to the identifying characteristics of the software images 110 of the control boards 126 of appliance 102 (FIG. 2). For instance, for this exemplary embodiment, the metadata 230 of the update images 220 includes a board address, a hardware identification, an image identification, an image version, and an image type. Such identifying characteristics of metadata 230 can correspond to one or more control boards 126 of a target appliance, as noted above. For instance, an update image 220 having a particular hardware identification may only be programmed into a control board having a matching hardware identification. As another example, an update image having a particular image identification may only be programmed into a control board having a matching image identification. Payload 240 includes the functional aspects of the software image.

Software update package 200 also includes a hashing algorithm 260. Hashing algorithm 260 is configured for identification and analysis of certain features. For instance, programming entity 104, by executing hashing algorithm 260, may perform a hashing analysis of a particular appliance configuration or payload configuration. As one example, each individual image (from the appliance, the payload, or both) may be defined by a hash. The hashing algorithm 260 may be used to quickly identify and analyze the information or characteristics of the images. That is, in some embodiments, hashing algorithm 260 may be used to determine whether a hash representative of update images 220 of a particular candidate payload 210 match a hash representative of software images 110 of one of the control boards 126 of appliance 102. If the hashes match, then it is determined that the update images 220 match the software images 110. If the hashes do not match, then it is determined that the updated images 220 are not a match for the software images 110 and consequently the candidate payload 210 is not a candidate for updating the software configuration of appliance 102. In some embodiments, each payload or the entire appliance configuration may be defined by a hash. The hashing algorithm 260 may be used to quickly identify and analyze the information/characteristics of such payloads or appliance configurations. In some alternative embodiments, software update package 200 does not include hashing algorithm 260.

Figure 4:
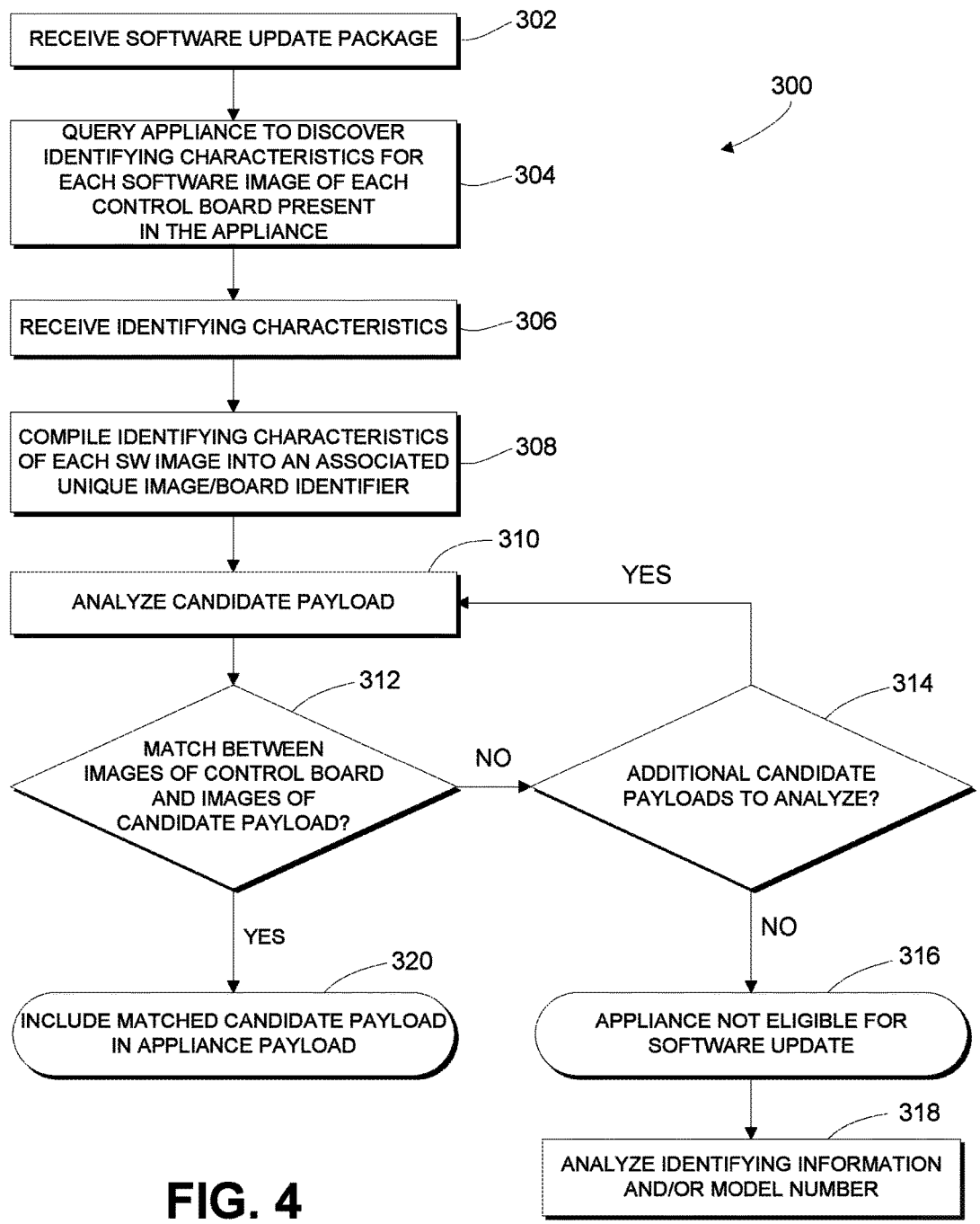
FIG. 4 provides a flow diagram of an exemplary method for performing a software update on an appliance according to exemplary embodiments of the present disclosure.

FIG. 4 provides a flow diagram of an exemplary method (300) for updating a software configuration of an appliance according to exemplary embodiments of the present disclosure. Method (300) can be implemented by one or more computing devices, e.g., such as one or more of the programming entity 104, server 106, or controller 124 of appliance 102 depicted in FIG. 1. Accordingly, the reference numerals referring to the various features in the drawings of FIGS. 1 through 3 will be used below to provide context to method (300).

At (302), method (300) includes receiving, by one or more computing devices, a software update package. The software update package includes a plurality of candidate payloads applicable to a plurality of appliance configurations. Further, each candidate payload includes one or more update images. For example, programming entity 104 may receive software update package 200 from remote server 106. Software update package 200 may include a plurality of candidate payloads 210, e.g., as shown in FIG. 3. The candidate payloads 210 are applicable to a plurality of appliance configurations. For instance, the software update package 200 may include candidate payloads 210 applicable to a plurality of refrigerator appliance platforms, such as e.g., Platform A, Platform B, Platform C, etc. with each platform having a different configuration. Candidate payloads for other appliance configurations may likewise be included in software update package 200 as well. In this way, a service technician may need only a single software package or file for updating the software configurations of appliances in the field.

In addition, each candidate payload 210 may include one or more update images 220, as noted above. Each update image 220 includes metadata 230 and payload 240. Metadata 230 includes various identifying characteristics, such as e.g., a board address, a hardware identification, an image identification, an image version, an image type, some combination of these characteristics, etc. Depending on the configuration of the one or more control boards 126 of appliance 102, one or more of the candidate payloads 210 of software update package 200 may be selected and provided to appliance 102 as an appliance payload to update the software configuration of appliance 102 as will be described in further detail below.

At (304), method (300) includes querying, by the one or more computing devices, the appliance to discover identifying characteristics associated with the software images of the one or more control boards present in the appliance. For instance, programming entity 104 may query appliance 102 to discover information about the software images 110 on the control boards 126 present in appliance 102. Preferably, when appliance 102 is queried, each software image 110 of each control board 126 is queried such that identifying characteristics found within metadata 136 may be discovered and extracted for analysis. By querying appliance 102, programming entity 104 may gather identifying characteristics associated with the various control boards 126 of appliance 102, and as such, the "fingerprint" of appliance 102 may be determined.

At (306), method (300) includes receiving, by the one or more computing devices, for one or more control boards present in the appliance, identifying characteristics associated with one of the one or more control boards. That is, the identifying characteristics discovered during querying at (304) are received, e.g., by programming entity 104, remote server 106, or both. Preferably, identifying characteristics are received for each software image 110 of each control board 126 present in appliance 102. In this way, the full fingerprint of appliance 102 may be received.

Figure 5:
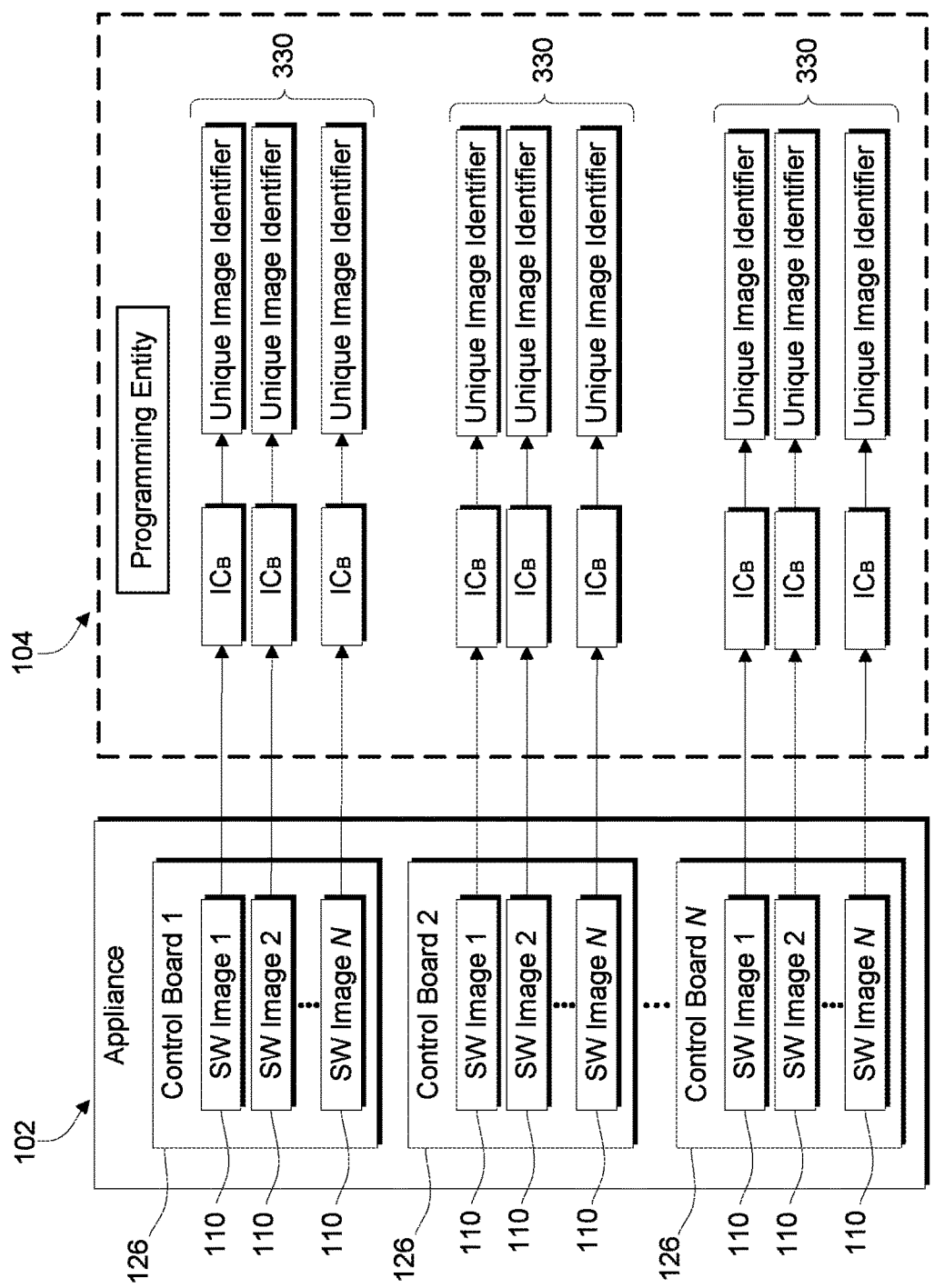
FIG. 5 provides a block diagram for determining unique image identifiers according to exemplary embodiments of the present disclosure.

At (308), in some implementations, method (300) includes compiling, by the one or more computing devices, the identifying characteristics of each software image of each control board of the appliance into a unique image identifier. For instance, FIG. 5 provides a flow diagram of one exemplary manner in which unique image identifiers 330 may be compiled according to exemplary embodiments of the present disclosure. As shown in FIG. 5, the identifying characteristics, denoted as "$IC_B$", for each software image 110 of each control board 126 are received by programming entity 104. The programming entity 104 then compiles the identifying characteristics $IC_B$ for each software image 110 of each control board 126 into respective unique image identifiers 330. Thus, each software image 110 has an associated unique image identifier 330. As depicted in FIG. 5, the identifying characteristics $IC_B$ received for each software image 110 of Control Board 1 are compiled into respective unique image identifiers 330, the identifying characteristics $IC_B$ received for each software image 110 of Control Board 2 are compiled into respective unique image identifiers 330, and so on until the identifying characteristics $IC_B$ received for each software image 110 of Control Board N are compiled into respective unique image identifiers 330.

Unique image identifiers 330 may each be a long string of numbers (e.g., machine-readable numbers) or may be a hash created by hashing algorithm 260, for example.

Figure 6:
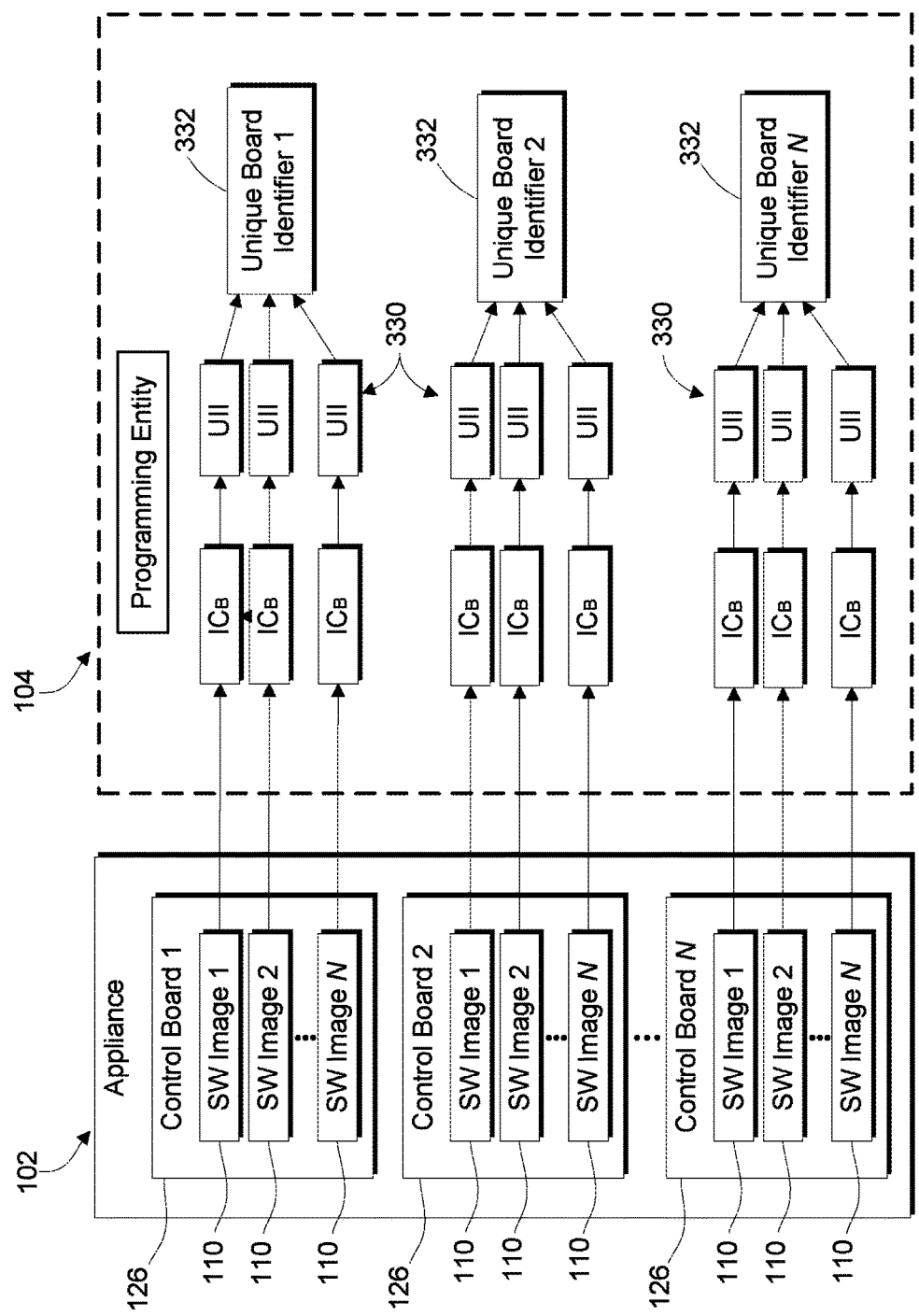
FIG. 6 provides a block diagram for determining unique board identifiers according to exemplary embodiments of the present disclosure.

In some other alternative exemplary implementations, at (308), method (300) includes compiling, by the one or more computing devices, the identifying characteristics from the software images of each control board of the appliance into unique board identifiers for each control board of the appliance. For instance, FIG. 6 provides a flow diagram of one exemplary manner in which unique board identifiers 332 may be determined according to exemplary embodiments of the present disclosure. As shown in FIG. 6, identifying characteristics $IC_B$ for each software image 110 of each control board 126 are received by programming entity 104. The programming entity 104 then compiles the identifying characteristics $IC_B$ for each control board 126 into respective unique board identifiers 332. In some implementations, as depicted in FIG. 6, the identifying characteristics $IC_B$ received for each software image 110 of Control Board 1 are compiled into respective unique image identifiers 330 (denoted as "UII") and then the unique image identifiers 330 associated with Control Board 1 are further compiled into a Unique Board Identifier 1, the identifying characteristics $IC_B$ received for each software image 110 of Control Board 2 are compiled into respective unique image identifiers 330 and then the unique image identifiers 330 associated with Control Board 2 are further compiled into a Unique Board Identifier 2, and so on until the identifying characteristics $IC_B$ received for each software image 110 of Control Board N are compiled into respective unique image identifiers 330 and then the unique image identifiers 330 associated with Control Board N are further compiled into a Unique Board Identifier N. Unique board identifiers 332 may each be a long string of numbers (e.g., machine-readable numbers) or may be a hash readable by hashing algorithm 260, for example.

Alternatively, in other implementations, the identifying characteristics received for each software image 110 of Control Board 1 are compiled directly into a Unique Board Identifier 1, the identifying characteristics received for each software image 110 of Control Board 2 are compiled directly into a Unique Board Identifier 2, and so on until the identifying characteristics received for each software image 110 of Control Board N are compiled directly into a Unique Board Identifier N. Unique board identifiers 332 may each be a long string of numbers (e.g., machine-readable numbers) or may be a hash readable by hashing algorithm 260, for example. Further, in alternative exemplary implementations, (308) may be omitted.

Figure 7:
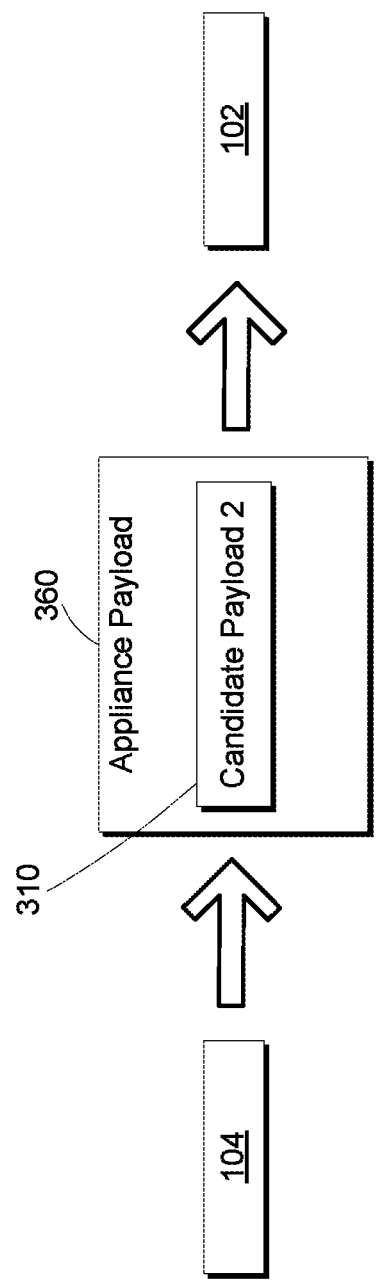
FIG. 7 provides an exemplary appliance payload being provided to an appliance according to exemplary embodiments of the present disclosure.

At (310), (312), (314), with reference again to FIG. 4, method (300) includes determining, by the one or more computing devices, an appliance payload from the one or more candidate payloads based at least in part on the identifying characteristics associated with the software images of the one or more control boards of the appliance and based at least in part on the identifying characteristics associated with the one or more update images of the one or more candidate payloads of the software package. Stated alternatively, at (310), (312), and (314), various candidate payloads of the software update package are analyzed, and if one or more of the candidate payloads are a match for the appliance in question, the matching candidate payload is selected for inclusion in the appliance payload that is to be provided to appliance 102. Thus, the appliance payload includes one or more candidate payloads of the software update package that have identifying characteristics that "match" or correlate to the identifying characteristics associated with the software images of the control boards present in the appliance. In this way, ultimately, an appliance payload 360 may be provided from the programming entity 104 or another suitable device to the appliance 102 so that the software configuration of the appliance 102 may be updated, e.g., as shown in FIG. 7.

One exemplary manner in which the appliance payload may be determined based at least in part on the identifying characteristics associated with the software images of the one or more control boards of the appliance and based at least in part on the identifying characteristics associated with the one or more update images of the one or more candidate payloads of the software package is provided as follows. At (310), one of the candidate payloads 210 is selected for analysis. That is, one of the candidate payloads is selected so that it may be analyzed to determine whether the candidate payload should be included in the appliance payload. For this exemplary implementation of method (300), to determine whether the candidate payload should be included in the appliance payload is determined by comparing the update images 220 of the candidate payload 210 with the software images 110 of each control board 126 of the appliance 102, e.g., in an image by image comparison, to see if the images match. More particularly, to determine if the update images 220 match the software images 110 of the appliance 102, the identifying characteristics of the software images 110 associated with the one or more control boards 126 of appliance 102 are compared with or against the identifying characteristics associated with the update images 220 of the candidate payload 210.

Figure 8:
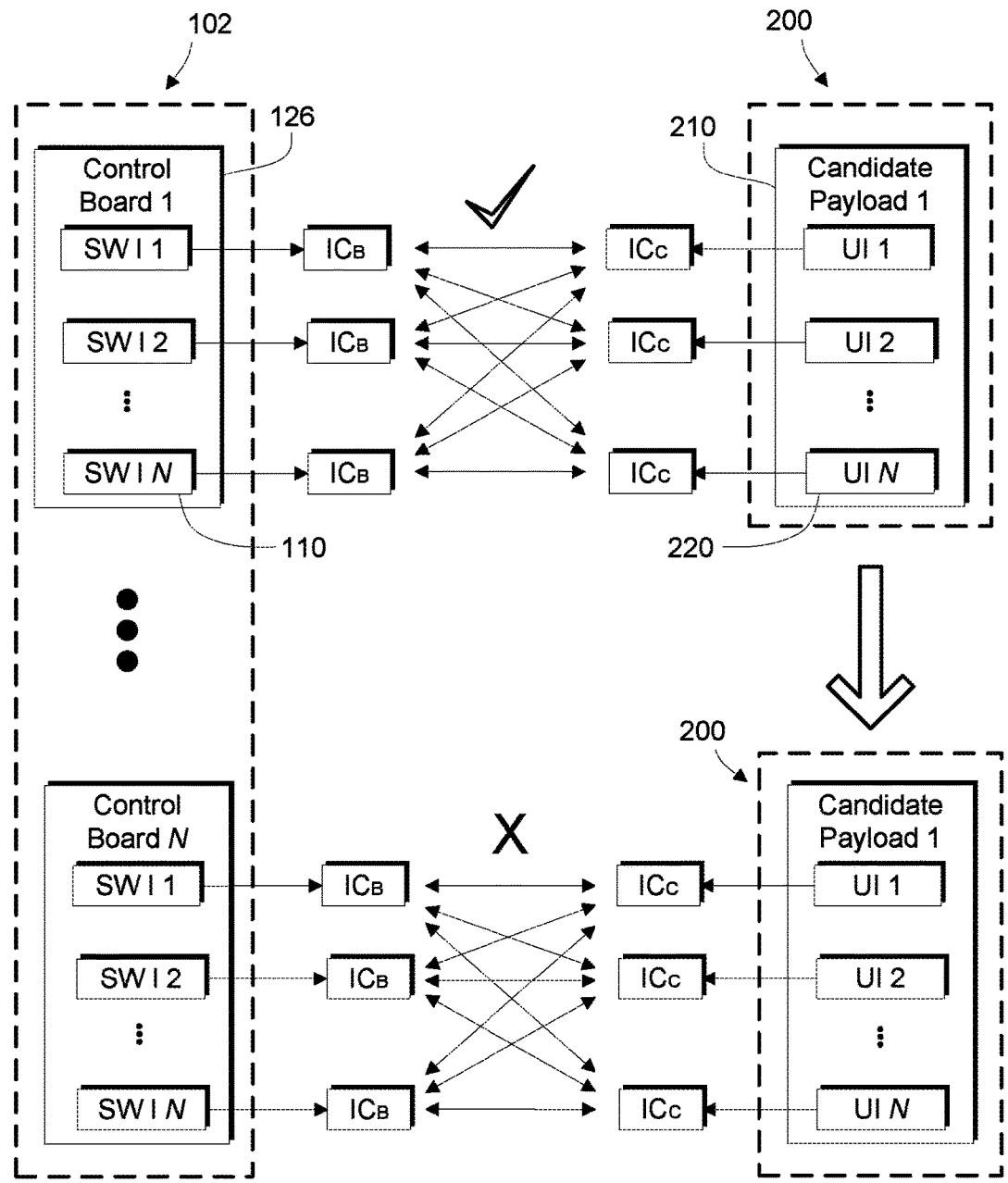
FIG. 8 provides a block diagram of one exemplary manner in which identifying characteristics associated with software images of the control boards of an appliance may be compared with the identifying characteristics associated with update images of the candidate payloads of the software update package according to exemplary embodiments of the present disclosure.

FIG. 8 provides a block diagram of one exemplary manner in which the identifying characteristics associated with the one or more control boards 126 of appliance 102 are compared with the identifying characteristics associated with the update images 220 of the candidate payloads 210. As shown in FIG. 8, Candidate Payload 1 is selected for analysis. The identifying characteristics (denoted as "$IC_C$") for each update image 220 of Candidate Payload 1 are extracted from their respective update images 220. The identifying characteristics $IC_C$ of the update images 220 may include, for example, a board address, a hardware identification, an image identification, an image version, and/or an image type (e.g., see FIG. 3). Further, the identifying characteristics (denoted as "$IC_B$") for each software image 110 of Control Board 1 are extracted from their respective software images 110. The identifying characteristics $IC_B$ may include, for example, a board address, hardware identification, image identification, image version, and/or an image type (e.g., see FIG. 2).

To determine if Candidate Payload 1 is a match (i.e., to determine if Candidate Payload 1 should be included in the appliance payload), the identifying characteristics $IC_C$ for each update image 220 of Candidate Payload 1 are compared against the identifying characteristics $IC_B$ of the software images 110 of Control Board 1. For this implementation, the identifying characteristics $IC_C$ of the update images 220 of Candidate Payload 1 matched (as shown by the checkmarks in FIG. 8) the identifying characteristics $IC_B$ of the software images 110 of Control Board 1. However, as appliance 102 includes multiple control boards 126, the identifying characteristics $IC_C$ of the update images 220 of Candidate Payload 1 are further compared against the identifying characteristics $IC_B$ of the software images 110 of the other control boards 126. As shown in FIG. 8, when the identifying characteristics $IC_C$ of the update images 220 of Candidate Payload 1 were compared against the identifying characteristics $IC_B$ of the software images 110 of Control Board N, not all of the images matched (as denoted by the "X"), and therefore, at (312) Candidate Payload 1 is determined not to be a match for the appliance payload.

In alternative exemplary implementations, to determine if a particular candidate payload 210 is a match for the appliance 102 in question (i.e., to determine if the candidate payload 210 should be included in the appliance payload 360), the identifying characteristics $IC_C$ for each update image 220 of the candidate payload 210 are compared with the unique image identifiers 330 (FIG. 5) of the software images 110 of the control boards 126 of appliance 102. If the identifying characteristics $IC_C$ of each update image 220 of the candidate payload 210 correlate with or match the unique image identifiers 330 of the software images 110 of the control boards 126 of appliance 102, then the candidate payload is selected for inclusion in the appliance payload.

In yet other exemplary implementations, to determine if a particular candidate payload 210 is a match, the identifying characteristics $IC_C$ for each update image 220 of the candidate payload 210 are compared with the unique board identifiers 332 (FIG. 6) associated with the control boards 126 of appliance 102. If the identifying characteristics $IC_C$ of each update image 220 of the candidate payload 210 correlate with or match the unique board identifiers 332 of the control boards 126 of appliance 102, then the candidate payload is selected for inclusion in the appliance payload.

At (312), with reference again to FIG. 4, if there is a match between the update images of the candidate payload 210 and the software images 110 of the control boards 126 of appliance 102, then there is a match and the control logic proceeds to (320) where the matched candidate payload is included in the appliance payload to be provided to the appliance 102. If, however, there is no match between the update images 220 of the candidate payload 210 and the software images 110 of the control boards 126 of appliance 102, then the logic proceeds to (314).

At (314), if there are yet further candidate payloads to analyze, the logic returns to (310). Continuing with the example above, supposing that Candidate Payload 1 was not a match for appliance 102 and that there are further candidates to analyze, the logic loops back to (310). The control logic recursively iterates until a candidate payload is matched or until all candidate payloads are analyzed. The candidate-matching algorithm may recursively iterate in an efficient manner to speed the comparison process. For instance, if the board addresses of the software images associated with the control boards of the appliance and the update images do not match, the other characteristics are not analyzed, e.g., the hardware identifications, image identification, etc. are not analyzed. The candidate-matching algorithm can be tuned to be broad or narrow in terms of assessing the specific matching characteristics.

Figure 9:
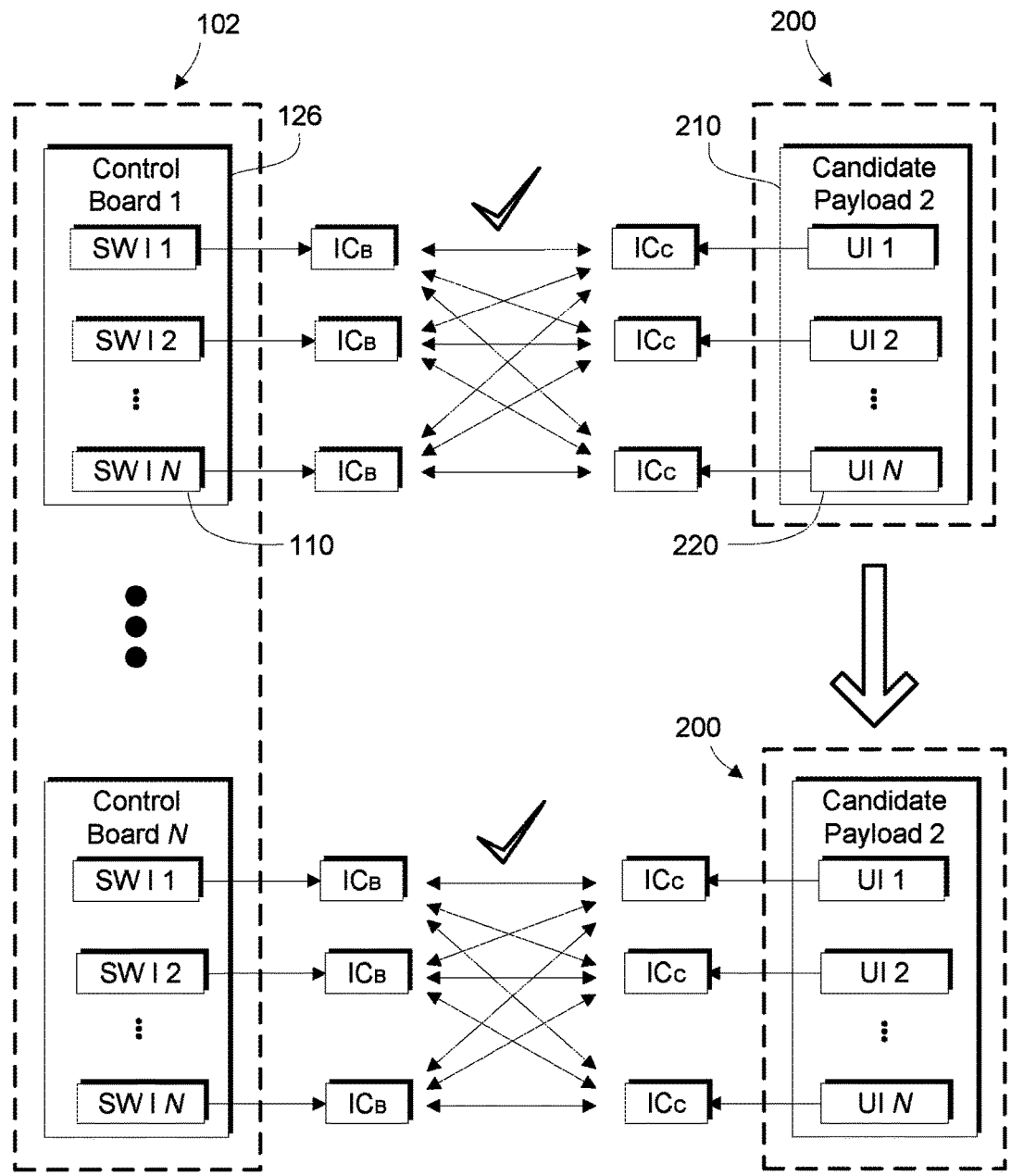
FIG. 9 provides another block diagram of one exemplary manner in which identifying characteristics associated with software images of the control boards of an appliance may be compared with the identifying characteristics associated with update images of the candidate payloads of the software update package according to exemplary embodiments of the present disclosure.

With reference to FIG. 9, another block diagram depicting the manner in which the identifying characteristics associated with the one or more control boards 126 of appliance 102 are compared with the identifying characteristics associated with the update images 220 of the candidate payloads 210 is provided. As Candidate Payload 1 was determined not to be a match for the appliance payload 360 (see FIG. 8), the next candidate payload is analyzed, which in this example is Candidate Payload 2. To determine if Candidate Payload 2 is a match (i.e., to check if Candidate Payload 2 should be included in the appliance payload), the identifying characteristics $IC_C$ for each update image 220 of Candidate Payload 2 are compared against the identifying characteristics $IC_B$ of the software images 110 of Control Board 1. For this implementation, the identifying characteristics $IC_C$ of the update images 220 of Candidate Payload 1 matched the identifying characteristics $IC_B$ of the software images 110 of Control Board 1 (as shown by the checkmarks in FIG. 9). As appliance 102 includes multiple control boards 126, the identifying characteristics $IC_C$ of the update images 220 of Candidate Payload 2 are further compared against the identifying characteristics $IC_B$ of the software images 110 of the other control boards 126. As shown in FIG. 9, all of the identifying characteristics $IC_C$ of the update images 220 of Candidate Payload 2 matched the identifying characteristics $IC_B$ of the software images 110 of Control Board N (and all the other control boards 126 present in appliance 102), and thus, at (312) as shown in FIG. 4, Candidate Payload 2 is selected for inclusion in the appliance payload to be provided to appliance 102, e.g., as shown in FIG. 7.

In some implementations, for there to be a match between the identifying characteristics of the software images and the identifying characteristics of the update images, the identifying characteristics of the images must match exactly. Stated differently, there must be total compatibility between the update images of the candidate payload and the software images of the control boards 126 of appliance 102. In some implementations, however, only the board address, hardware identifications, and image identifications must match. Thus, in such implementations, the image versions of the update images of the candidate payload and the software images of the appliance need not match for the candidate payload to be included in the appliance payload.

Further, in some implementations, the software update package 200 may include candidate payloads that can map to multiple appliance configurations, but each appliance may only map to one candidate payload of the software update package 200. This may be thought of as a lock-and-key pairing. In such implementations, with reference to the example above, subsequent candidate payloads (e.g., payloads after Candidate Payload 2) need not be analyzed as Candidate Payload 2 was found to be a match.

Returning to FIG. 4, if the candidate payload is determined to be a match from the appliance 102 at (312), the logic proceeds to (320) where the candidate payload is included in the appliance payload. If, however, all the candidate payloads have been analyzed and no match has been found, then the control logic proceeds to (316).

At (316), if it is determined that there are no further candidate payloads to analyze at (314) and that there have not been any candidate payloads that are a match for appliance 102 as determined at (312), then appliance 102 is deemed not eligible for this particular software update and method (300) ends.

At (318), in some implementations of method (300), the identifying characteristics associated with the software images of the one or more control boards of the appliance that were discovered during the attempted software update are further analyzed. In particular, if none of the plurality of candidate payloads are a match for the appliance payload, it is advantageous to determine whether the appliance configuration is a known or unknown configuration. If the configuration is known, then it is determined that the particular configuration of appliance 102 simply was not intended to be updated by software update package 200. If, however, the configuration is unknown, then it may be prudent to investigate the unknown configuration. For example, an unknown appliance configuration may be a result of a production line error (e.g., the incorrect control board was installed or the wrong software package was installed on one or more control boards of the appliance in the factory). As another example, the unknown appliance configuration may be a result of a counterfeit appliance or software package. Identifying such counterfeit appliances may be useful.

Accordingly, in some implementations of method (300), in further analyzing the identifying characteristics associated with the software images of the one or more control boards of the appliance, the method includes comparing the identifying characteristics associated with the software images of the one or more control boards of the appliance with a plurality of configuration identifiers stored in a master configuration library. Method (300) also includes determining whether the identifying characteristics match one of the plurality of configuration identifiers stored in the master configuration library based at least in part on the comparison between the identifying characteristics and the plurality of configuration identifiers. Method (300) further includes earmarking the identifying characteristics of the appliance if the identifying characteristics do not match any of the plurality of configuration identifiers. Accordingly, a further investigation into the earmarked appliance configuration may be pursued (e.g., a further investigation may lead to determining that the appliance is counterfeit, that some or all of the appliance parts are counterfeit, that the appliance has counterfeit software, has a production issue, etc.).

Figure 10:
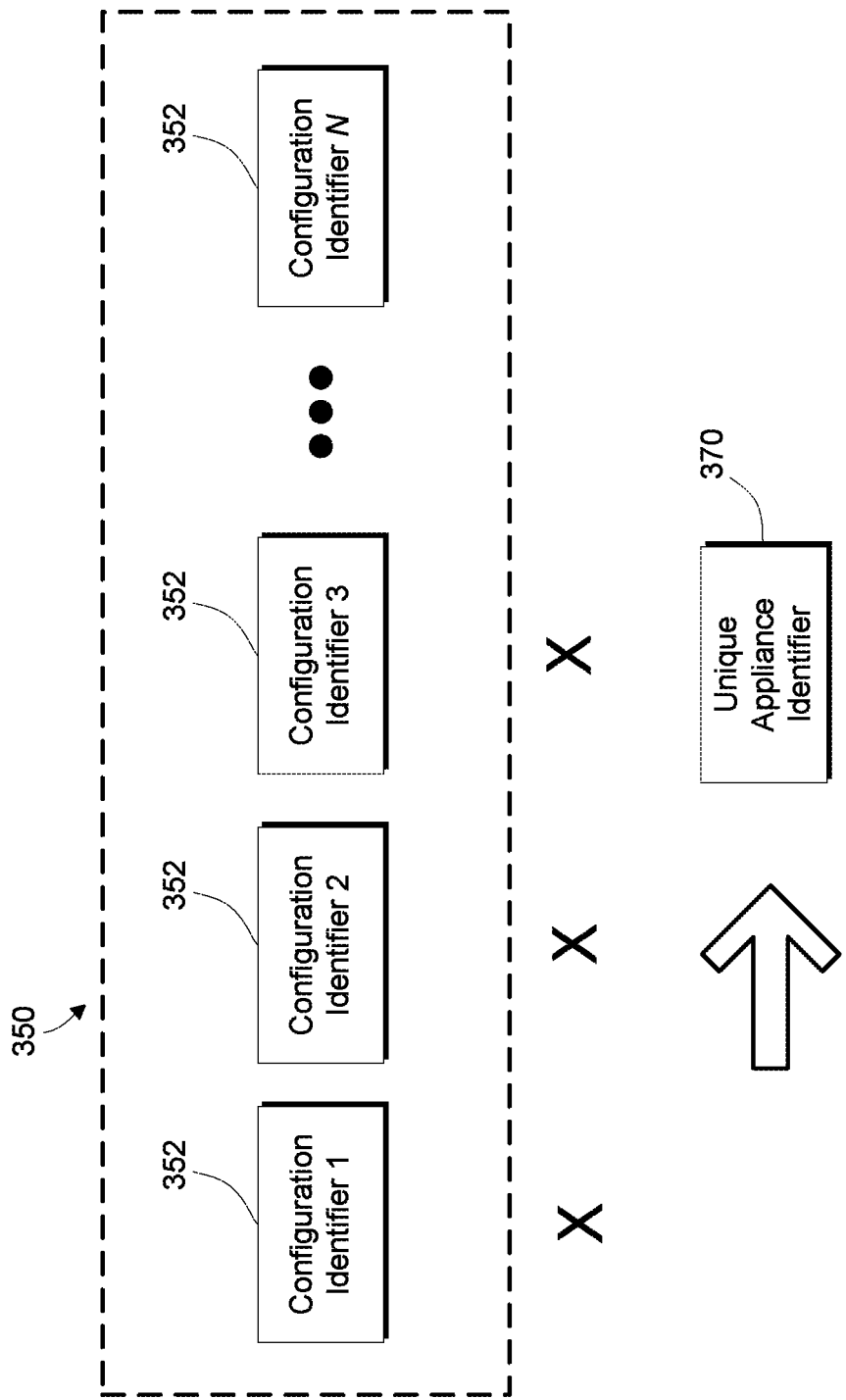
FIG. 10 provides a block diagram of one exemplary manner in which identifying characteristics associated with the control boards of an appliance may be compared with configuration identifiers stored in a master configuration library according to exemplary embodiments of the present disclosure.

For example, FIG. 10 provides a block diagram of one exemplary manner in which identifying characteristics associated with the software images of the control boards of an appliance may be compared with the configuration identifiers stored in a master configuration library according to exemplary embodiments of the present disclosure. As shown, for this example, the identifying characteristics discovered and received at (304) and (306) (FIG. 4), respectively, are correlated or compared with a plurality of configuration identifiers 352 stored in master configuration library 350. Master configuration library 350 may be stored on programming entity 104, on remote server 106, or both, for example. Configuration identifiers 352 represent all known configurations of each appliance in a particular group or fleet of appliances. The identifying characteristics associated with the software images of the control boards of the appliance may be compiled into a unique appliance identifier 370 (which may be a hash or string of numbers) that is compared with or compared against each configuration identifier 352. For instance, as shown in the depicted embodiment of FIG. 10, unique appliance identifier 370 is compared with Configuration Identifier 1, and as no match was found (denoted by the "X"), the unique appliance identifier 370 is then compared with subsequent configuration identifiers 352. For instance, in this example, unique appliance identifier 370 is subsequently compared with Configuration Identifier 2, Configuration Identifier 3, and so on until Configuration Identifier N. As noted above, if no match exists, unique appliance identifier 370 is earmarked such that it may be further investigated.

In yet other implementations, additionally or alternatively to analyzing the identifying characteristics, method (300) includes receiving a model number of the appliance (if it is available). Thereafter, method (300) includes comparing, by the one or more computing devices, the model number with known model numbers stored in master configuration library, which may include a model number library. If the model number received is not in the model number library, the model number is earmarked such that it may be further investigated. In this way, configuration management of appliance model numbers may be better maintained, issues in production may be better tracked, and counterfeit appliances may be discovered.

At (320), if the candidate payload is determined to be a match from the appliance 102 at (312), the matching candidate payload is included in the appliance payload 360, e.g., as shown in FIG. 7. In this way, the appliance payload 360 may be provided to the appliance 102. As one example, the appliance payload 360 may be provided to the appliance 102 in the following manner. The appliance payload 360 may be "opened up" by programming entity 104 and each update image 220 of the candidate payload 210 selected for inclusion in the appliance payload 360 may be downloaded to a corresponding control board 126 of the appliance 102.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of updating a software configuration of an appliance, the method comprising:
    receiving, by one or more computing devices, a software update package comprising a plurality of candidate payloads applicable to a plurality of appliance configurations, each of the plurality of candidate payloads comprising one or more update images each comprising identifying characteristics, and wherein the identifying characteristics of the one or more update images of the candidate payloads of the software update package comprise a board address, a hardware identification, and an image identification;
    receiving, by the one or more computing devices, for one or more control boards present in the appliance, identifying characteristics associated with one or more software images of the one or more control boards present in the appliance, and wherein the identifying characteristics associated with the one or more software images of the one or more control boards present in the appliance comprise a board address, a hardware identification, and an image identification;
    determining, by the one or more computing devices, an appliance payload from the plurality of candidate payloads based at least in part on the identifying characteristics associated with the one or more software images of the one or more control boards present in the appliance and the identifying characteristics of the update images of the candidate payloads of the software update package,
    wherein determining the appliance payload from the plurality of candidate payloads comprises comparing, by the one or more computing devices, the identifying characteristics associated with the one or more software images of the one or more control boards present in the appliance with the identifying characteristics of the update images of the candidate payloads of the software update package, and wherein when the board address, the hardware identification, and the image identification of the identifying characteristics associated with the one or more software images matches the board address, the hardware identification, and the image identification of the identifying characteristics associated with the one or more update images of one of the plurality of candidate payloads, respectively, the candidate payload associated with the matching identifying characteristics is selected for inclusion in the appliance payload.

2. The method of claim 1, further comprising:
providing, by the one or more computing devices, the appliance payload to the appliance.

3. The method of claim 1, wherein determining comprises comparing, by the one or more computing devices, the identifying characteristics associated with the one or more software images of the one or more control boards present in the appliance with the identifying characteristics of the update images of the plurality of candidate payloads of the software update package, wherein if the identifying characteristics associated with the one or more software images match the identifying characteristics of the update images of one of the plurality of candidate payloads, the candidate payload with the matching identifying characteristics is selected for inclusion in the appliance payload.

4. The method of claim 1, wherein the identifying characteristics associated with the one or more software images of the one or more control boards present in the appliance are received for each one of the one or more control boards present in the appliance.

5. The method of claim 1, wherein the identifying characteristics associated with the one or more software images of the one or more control boards present in the appliance comprise a board address, a hardware identification, an image identification, an image type, and an image version.

6. The method of claim 1, wherein each of the one or more update images comprise metadata, the metadata comprising the identifying characteristics associated with the one or more update images, and wherein the method further comprises:
compiling, by the one or more computing devices, for each of the one or more software images, the identifying characteristics associated with one or more software images of the one or more control boards present in the appliance into a unique image identifier; and
comparing, by the one or more computing devices, the unique image identifiers with the identifying characteristics of the one or more update images of one of the plurality of candidate payloads.

7. The method of claim 6, wherein determining, by the one or more computing devices, the appliance payload from the plurality of candidate payloads based at least in part on the identifying characteristics associated with the one or more software images of the one or more control boards of the appliance is determined based at least in part on the comparison between the unique image identifiers and the identifying characteristics of the one or more update images.

8. The method of claim 6, further comprising:
compiling, by the one or more computing devices, a unique board identifier for each of the one or more control boards present in the appliance based on the unique image identifiers.

9. The method of claim 1, wherein the identifying characteristics associated with one or more software images of the one or more control boards present in the appliance comprise a board address, a hardware identification, and an image identification, and wherein the identifying characteristics of the update images of the candidate payloads of the software update package comprise a board address, a hardware identification, and an image identification, and wherein when the board address, the hardware identification, and the image identification of the identifying characteristics associated with the one or more software images match the board address, the hardware identification, and the image identification of the identifying characteristics associated with the one or more update images of one of the plurality of candidate payloads, the candidate payload associated with the matching identifying characteristics is selected for inclusion in the appliance payload.

10. The method of claim 1, further comprising:
receiving a model number of the appliance;
comparing, by the one or more computing devices, the model number with a model number library, and wherein if the model number received is not in the model number library, the model number is earmarked.

11. A system for updating a software configuration of an appliance having one or more control boards, the system comprising:
a programming entity in operative communication with the appliance, the programming entity comprising one or more processors and one or more non-transitory memory devices, and wherein the one or more non-transitory memory devices store instructions that when executed by the one or more processors cause the programming entity to perform operations such that the programming entity is configured to:
receive a software update package, the software update package comprising a plurality of candidate payloads each comprised of one or more update images, each of the one or more update images comprising identifying characteristics;
query the appliance to discover identifying characteristics associated with one or more software images of the one or more control boards present in the appliance, wherein the identifying characteristics associated with one or more software images of the one or more control boards present in the appliance are descriptive of a hardware and a software configuration of respective ones of the one or more control boards;
receive the identifying characteristics associated with the one or more software images of the one or more control boards present in the appliance;
compile the identifying characteristics associated with the one or more software images into unique image identifiers, wherein each of the one or more software images has an associated unique image identifier;
compare the unique image identifiers with the identifying characteristics of the one or more update images of the plurality of candidate payloads;
determine an appliance payload based at least in part on the comparison between the unique image identifiers and the identifying characteristics of the plurality of candidate payloads of the software update package,
wherein determining the appliance payload from the plurality of candidate payloads comprises comparing, by the one or more computing devices, the identifying characteristics associated with the one or more software images of the one or more control boards present in the appliance with the identifying characteristics of the update images of the candidate payloads of the software update package, and
wherein when the board address, the hardware identification, and the image identification of the identifying characteristics associated with the one or more software images matches the board address, the hardware identification, and the image identification of the identifying characteristics associated with the one or more update images of one of the plurality of candidate payloads, respectively, the candidate payload associated with the matching identifying characteristics is selected for inclusion in the appliance payload.

12. The system of claim 11, wherein the programming entity is further configured to:
provide the appliance payload to the appliance.

13. The system of claim 11, wherein when the unique image identifiers are matched with the identifying characteristics of the one or more update images of one of the plurality of candidate payloads during comparing, the candidate payload associated with the matching update images is selected for inclusion in the appliance payload.

14. The system of claim 11, wherein the identifying characteristics associated with the one or more software images comprise a board address, a hardware identification, an image identification, an image type, and an image version and wherein the identifying characteristics of each of the one or more update images comprise a board address, a hardware identification, an image identification, an image type, and an image version.

15. The system of claim 11, wherein the unique image identifiers are each hashes created by a hashing algorithm.

16. The system of claim 11, wherein if the unique image identifiers do not match the identifying characteristics associated with the one or more update images of any of the plurality of candidate payloads, the programming entity is further configured to:
compare the unique image identifiers with a plurality of configuration identifiers stored in a master configuration library;
determine whether the unique image identifiers match one of the plurality of configuration identifiers stored in the master configuration library based at least in part on the comparison between the unique image identifiers and the plurality of configuration identifiers; and
earmark the unique image identifiers of the appliance that do not match any of the plurality of configuration identifiers.

17. A method for updating a software configuration of an appliance having one or more control boards, the method comprising:
receiving a software update package comprising a plurality of candidate payloads each comprising one or more update images each comprised of metadata, the metadata of each of the one or more update images comprising identifying characteristics, and wherein the identifying characteristics of the one or more update images of the candidate payloads of the software update package comprise a board address, a hardware identification, and an image identification;
querying the appliance to discover metadata of one or more software images associated with the one or more control boards present in the appliance, the metadata of each of the one or more software images comprising identifying characteristics, and wherein the identifying characteristics associated with the one or more software images of the one or more control boards present in the appliance comprise a board address, a hardware identification, and an image identification;
receiving the identifying characteristics of the one or more software images; comparing the identifying characteristics of the one or more update images with the identifying characteristics of the one or more software images;
determining if one of the plurality of candidate payloads of the software update package are a match for the appliance based at least in part on the comparison between the identifying characteristics of the one or more update images and the identifying characteristics of the one or more software images, and
wherein when the identifying characteristics associated with the one or more software images match the identifying characteristics associated with the one or more update images of one of the plurality of candidate payloads, the candidate payload associated with the matching identifying characteristics is selected for inclusion in the appliance payload.

18. The method of claim 17, further comprising:
compiling the identifying characteristics of the one or more software images into respective unique image identifiers, wherein during comparing, the unique image identifiers are compared against the identifying characteristics of the one or more updated images.

19. The method of claim 17, wherein if the identifying characteristics of the one or more software images do not match the identifying characteristics of the one or more update images of any of the candidate payloads, the method further comprises:
comparing the identifying characteristics of the one or more software images with a plurality of configuration identifiers stored in a master configuration library;
determining whether the identifying characteristics of the one or more software images match one of the plurality of configuration identifiers stored in the master configuration library based at least in part on the comparison between the identifying characteristics of the one or more software images and the plurality of configuration identifiers; and
earmarking the identifying characteristics of the one or more software images of the appliance if the identifying characteristics of the one or more software images do not match any of the plurality of configuration identifiers.

* * * * *